United States Patent
Chiba et al.

[11] Patent Number: 6,104,030
[45] Date of Patent: Aug. 15, 2000

[54] OPTICAL PROBE HAVING TAPERED WAVE GUIDE AND SCANNING NEAR-FIELD OPTICAL MICROSCOPE UTILIZING OPTICAL PROBE

[75] Inventors: Norio Chiba; Hiroshi Muramatsu; Kunio Nakajima, all of Chiba, Japan

[73] Assignee: Seiko Instruments Inc., Japan

[21] Appl. No.: 08/821,532

[22] Filed: Mar. 21, 1997

[51] Int. Cl.[7] .................................................. H01J 37/00
[52] U.S. Cl. ....................................... 250/306; 250/423 F
[58] Field of Search .................... 250/306, 307, 250/423 F

[56] References Cited

U.S. PATENT DOCUMENTS

| | | | |
|---|---|---|---|
| 4,604,520 | 8/1986 | Pohl | 250/216 |
| 4,684,206 | 8/1987 | Bednorz et al. | 350/96.12 |
| 4,725,727 | 2/1988 | Harder et al. | 250/227.29 |
| 5,294,790 | 3/1994 | Ohta et al. | 250/216 |
| 5,353,632 | 10/1994 | Nakagawa | 250/306 |
| 5,384,464 | 1/1995 | De Fornel et al. | 250/492.2 |

FOREIGN PATENT DOCUMENTS

| | | |
|---|---|---|
| 7-260459 | 10/1995 | Japan . |
| 561912 | 3/1996 | Japan . |
| WO/95335207 | 12/1995 | WIPO . |

*Primary Examiner*—Bruce C. Anderson
*Attorney, Agent, or Firm*—Adams & Wilks

[57] ABSTRACT

An optical probe comprises a waveguide having an optical opening for passing light therethrough, the waveguide terminating in a sharp tip at a distal end thereof. A metal film is coated on the distal end of the waveguide except for the optical opening. The metal film has a curved surface gradually retreating from the optical opening to an outer circumference of the waveguide.

19 Claims, 4 Drawing Sheets

6,104,030

OPTICAL PROBE HAVING TAPERED WAVE GUIDE AND SCANNING NEAR-FIELD OPTICAL MICROSCOPE UTILIZING OPTICAL PROBE

BACKGROUND OF THE INVENTION

The present invention relates to a tapered waveguide used for an optical probe in a scanning near-field optical microscope which is one of scanning probe microscopes and can provide information on the characteristics of surface optical properties, a scanning near-field optical microscope using the optical probe having the tapered waveguide, and a method for forming an aperture of the tapered waveguide.

A scanning probe microscope represented by an atomic force microscope (hereinafter referred to as an AFM) or a scanning tunneling microscope (hereinafter referred to as an STM) has wide spread use because of its performance of observing the sample surface in high resolution.

On the other hand, various types of scanning near-field optical microscopes which can provide optical characteristics and topography of sample surface have been proposed. The scanning near-field optical microscopes control the distance between the tip of a sharpened optical probe including an optical waveguide and sample surface to smaller than optical wavelength. One microscope holds the optical fiber probe vertically to the sample and vibrates the tip of the probe horizontally to the sample surface. Variation in vibration amplitude caused by friction between the tip of the probe and the sample surface is detected as a displacement of the optical axis of laser light which has been irradiated from the tip of the probe and transmitted through the sample. The distance between the tip of the probe and the sample surface is kept constant during scanning by controlling a Z-axis positioner. Thus the scanning near-field optical microscope can provide distribution of the intensity of transmitted light through the sample and topography of the sample surface.

Another is a scanning near-field optical/atomic force microscope which uses a sharpened and bent optical fiber probe as a cantilever of an AFM. The scanning near-field optical/atomic force microscope can measure the characteristics of surface optical properties and topography simultaneously by applying a laser light to the sample from the tip of the optical fiber probe during its AFM operation.

Such a scanning near-field optical microscope which measures optical characteristics and a topography of a sample at the same time uses a tapered waveguide for an optical probe. The optical probe has a coating film on its tapered portion except its aperture.

FIG. 7 is a sectional view showing a conventional composition of an optical probe. Number 1 is an optical waveguide whose tip has been sharpened and number 51 is a coating film. The coating film 51 is composed of a single layer and is composed so as to have the same plane as the aperture surface. In case that this optical probe is mounted on a scanning near-field optical microscope, its topographical resolution is limited by the tip diameter of the optical probe including its coating film and its optical resolution by size of the aperture in the probe tip. For example, in case that the tip diameter of the tapered waveguide itself is 100 nm and the thickness of the coating film is 100 nm, provided that the coating film does not enter the aperture, the aperture is 100 nm in diameter and the tip of the optical probe including the coating film is about 300 nm in diameter.

In order to improve the topographical resolution, it is necessary to make the tip of an optical probe small in diameter. However, when the coating film is deposited thin, leaked light through the circumference of an aperture deteriorates optical resolution and contrast of optical characteristics.

On the other hand, when the coating film is deposited thick enough so as to not leak light, optical resolution and contrast of optical characteristics are deteriorated by reduction of an amount of light outputted from the aperture due to the coating film burying of the aperture in addition to deterioration of topographical resolution.

In the composition of the optical probe according to the prior art shown in FIG. 7, for a range of wavelength around 500 nm, a coating film 51 of aluminum can be coated ideally to about 50 nm in thickness, but actually needs to be about 100 nm in consideration of deterioration in its film quality and occurrence of pinholes. In this case, the tip of the optical probe is at least 200 nm or greater in diameter.

Furthermore, in case of additionally depositing a protective film outside the coating film or in case of additionally depositing a functional film such as a magnetic film and the like, the same problem as the above-mentioned case of depositing a thick coating film occurs.

SUMMARY OF THE INVENTION

An object of the invention is to provide an optical probe which is capable of measuring a topography and optical characteristics in high resolution in a scanning near field optical microscope.

Another object of the invention is to provide a method for forming an aperture of the optical probe improving a resolution of a topography and a resolution of optical characteristics in a scanning near field optical microscope.

In order to achieve the objects, an optical probe has a metal coating film at the end part except the aperture part has a curved surface retreating gradually from said aperture to the outer circumference at the end of said aperture part. And the coating film is composed of a first coating film forming the aperture part and a second coating film which is outside the first coating film and is formed into the shape of a taper in the vicinity of the end part.

On the other hand, a method for forming the aperture of the optical probe uses a process of depositing a metal film by means of a vacuum evaporation process as using an evaporation source which is long in the direction parallel with the tip part of the waveguide.

And another method for forming an aperture of an optical probe uses a process of depositing a metal coating film by means of a vacuum evaporation process using vapor generated from at least two or more evaporation sources disposed side by side in parallel with the direction of the tip part of the waveguide.

Furthermore, the other method for forming an aperture of an optical probe uses a process of depositing a first coating film from the side direction of the waveguide and a process of depositing a second coating film toward the tip from behind the depositing direction of the first coating film.

DETAILED DESCRIPTION OF THE PREFERRED EMBODIMENTS

Embodiments of the invention are described in the following with reference to the drawings.

Figure 1:
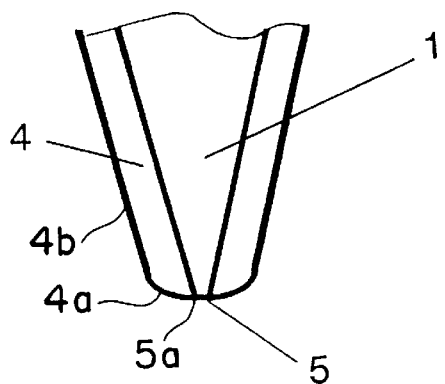
FIG. 1 is a sectional view showing composition of an optical probe showing the first embodiment of the invention.

FIG. 1 is a sectional view showing an optical probe according to a first embodiment of the invention. Number 1 is an optical fiber which is a waveguide and number 4 is a metal coating film, and the optical fiber 1 has a composition in which its tip is sharpened and its end part 5 is covered with a metal coating film 4 except its aperture part or optical opening 5a. The metal coating film 4 has a curved surface portion 4a retreating gradually from the aperture part to an outer circumference of the waveguide and a tapered surface portion 4b contiguous with the curved surface portion 4a and disposed on the outer circumference of the waveguide. As the optical fiber 1, a single-mode fiber, a multi-mode fiber, and a polarization-preserving fiber which vary in core diameter and in cladding diameter can be used. As another waveguide a capillary can be also used. As a material for the metal film 4, a light reflecting material such as gold, platinum, aluminum, chromium, nickel, or the like is used.

According to a composition as described above, it is possible to reduce an influence of thickness of a metal coating film upon a resolution of topographic image and easily make the metal coating film greater in thickness by making the metal coating film into the shape of a curved surface at the end of the aperture part. Therefore, it is possible to prevent a light from leaking through the circumference of the aperture as well as to prevent the aperture from being buried and to reconcile to each other improvement in resolution of a surface structure and improvement in optical resolution.

The composition of the optical probe as described above can be implemented in an optical probe whose tapered part is straight or in a optical probe whose tapered part is hook-shaped.

Figure 2:
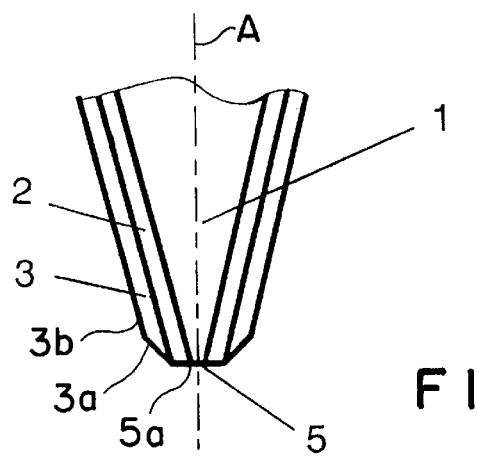
FIG. 2 is a sectional view showing composition of an optical probe showing the second embodiment of the invention.

FIG. 2 is a sectional view of composition of optical probe showing a second embodiment of the invention. Number 1 is an optical fiber which is a waveguide, number 2 is a first coating film and number 3 is a second coating film, and the optical fiber 1 has a composition in which its tip is sharpened and the part of its end part 5 except the aperture part is covered with the first coating film 2 and the second coating film 3 has a tapered surface portion 3a in the vicinity of the tip part and disposed outside the first coating film 2. The tapered surface portion 3a of the second coating film 3 diverges to an outer circumferential surface 3b of the second coating film. The outer circumferential surface 3b and the tapered surface portion 3a extend at different taper angles relative to a central axis A of the optical fiber 1. As a material for the first coating film 2, a light reflecting material such as gold, platinum, aluminum, chromium, nickel, and the like is used. As a material for the second coating film 3, the same material as the first coating film is used or another metal or nonmetal material which has anisotropy in the depositing direction and can be deposited by means of a thin film depositing means.

The combination of materials for the first and second coating films 2 and 3 can be selected according to a purpose of the use of a probe. Usually, the same material having a high reflectivity such as aluminum, gold and the like is used for both of the first and second coating films 2 and 3. In case of using aluminum having a high reflectivity in a short-wavelength range as the first metal film and also having a problem of oxidation or corrosion due to an environment of high temperature and humidity or due to chemicals, if a precious metal material such as gold, platinum, or the like is used as the second coating film 3, it can function as a protective film for the aluminum. In case of making the second coating film 3 function only as a protective film, a nonmetal material also can be used. Furthermore, in case of mounting and using an optical probe on a scanning magnetic force microscope, a high-reflectance material such as aluminum, gold or the like is used as the first coating film 2, and a magnetic material such as chromium, nickel or the like or a magnetic alloy material is used as the second coating film 3.

According to the composition of the optical probe as shown in FIG. 2, it is possible to make small the tip diameter of the optical probe including the coating films and prevent a light from leaking through the circumference of the aperture and prevent the aperture from being buried. Therefore, it is possible to reconcile to each other improvement in resolution of a surface structure and improvement in resolution of optical characteristics. And it is possible to add a protective film or a functional film to the optical probe without enlarging its tip diameter including the coating films.

The composition of the optical probe as described above can be implemented in an optical probe whose tapered part is straight or in a optical probe whose tapered part is hook-shaped.

Figure 3A:
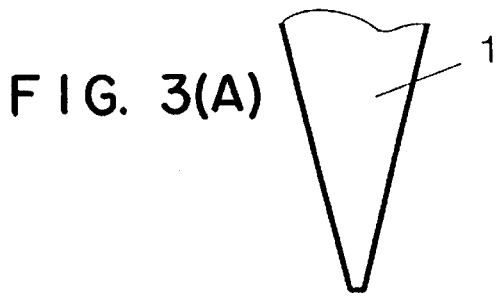
FIGS. 3A–C is a process diagram showing a method for forming an aperture of an optical probe of the invention.

FIG. 3 is a process diagram showing a method for forming an aperture of the optical probe shown in the embodiment in FIG. 2. FIG. 3(A) shows a process of sharpening an optical fiber 1 and shows a sharpened optical fiber. The optical fiber 1 has its coating film of synthetic resin removed from it across the length of 1 cm to 10 cm from its end and is cleaned on the surface of it and then is sharpened. As a method for sharpening, a method using a tensile breaking process of breaking the optical fiber by applying a tension to the optical fiber as heating it by means of a heating means or using a chemical etching process is used. In a method of tensile breaking, as a heating means, a method of applying a condensed carbonic acid gas laser light to the optical fiber or a method of heating the optical fiber passing through in the middle of a coil of platinum wire by making an electric current flow in the platinum wire can be used. As a chemical etching method, a method of immersing the optical fiber 1 in a mixed solution of hydrofluoric acid and ammonium fluoride to utilize difference in an etching speed between the core and the cladding or a method of immersing the optical fiber 1 in a two-layer solution of hydrofluoric acid and organic solvent to sharpen the optical fiber as utilizing a meniscus of the two-layer interface is used.

In case of making an optical probe in the shape of a hook, after being sharpened the optical fiber is transformed into the shape of a hook bent by 60 to 90 degrees, where the angle before bending is assumed to be 0 degree, by applying a laser light of a carbonic acid laser to the part of the optical fiber of 0.1 mm to 2 mm distant from the sharpened tip. In this case, since the side irradiated with the laser light absorbs a larger amount of heat than its opposite side, the tip part of the optical fiber comes to be bent to the side irradiated with the laser light by a surface tension brought by softening. The bending angle can be adjusted by controlling the output of the laser light as confirming a bending condition.

In case of forming a reflecting plane for an optical lever, after forming the optical fiber into the shape of a hook, a reflecting plane is formed by machine-polishing on the rear face of the hook-shaped part.

Figure 3B:
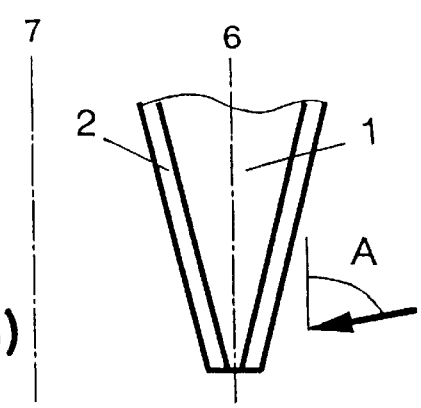

FIG. 3(B) is a sectional view showing a process of depositing a first coating film 2 on the tip part except the aperture part of the optical fiber formed in the process shown in FIG. 3(A). As a method for depositing the first coating film 2, a thin film depositing method having anisotropy such as a vacuum evaporation process, a sputtering process or the like is used, and a film thickness in a range from 20 nm to 1000 nm is selected. As shown by an arrow in FIG. 3(B), the depositing direction is toward the tip from behind the tip part, and the angle A is selected in a range from 20 to 90 degrees. The optical fiber 1 is turned around the central axis 6 of the tip part during deposition of the coating film. In case of turning the optical fiber 1 around an axis 7 in parallel with the central axis 6 of the tip part, if an eccentric distance of rotation of the optical fiber 1 is small enough in comparison with its depositing distance, the same effect can be obtained as the case that the optical fiber is turned around the central axis 6 of the tip part. In case of not turning the optical fiber 1, deposition is performed separately from at least two directions around the central axis 6 of the tip part.

Figure 3C:
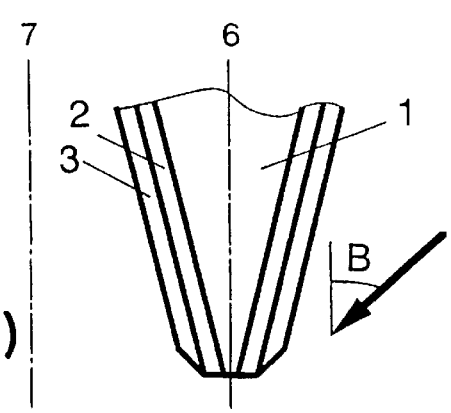

FIG. 3(C) is a sectional view showing a process of depositing a second coating film 3 which is formed into the shape of a taper in the vicinity of the tip part outside the first coating film 2. As a method for depositing the second coating film 3, in the same manner as the case of depositing the first coating film, a thin film depositing method having anisotropy such as a vacuum evaporation process, a sputtering process or the like is used, and a film thickness in a range from 20 nm to 1000 nm is selected. As shown by an arrow in FIG. 3(C), the depositing direction is toward the tip from behind the tip part, and the angle B is made smaller than the angle A shown in FIG. 2(B). The optical fiber 1 is turned around the central axis 6 of the tip part during deposition of the coating film. In case of turning the optical fiber 1 around an axis 7 in parallel with the central axis 6 of the tip part, if an eccentric distance of rotation of the optical fiber 1 is small enough in comparison with its depositing distance, the same effect can be obtained as the case that the optical fiber 1 is turned around the central axis 6 of the tip part. In case of not turning the optical fiber 1, deposition is separately and successively performed from at least two directions around the central axis 6 of the tip part.

According to a method for forming an aperture of an optical probe as shown in FIG. 3, it is possible to make a coating film with a first coating film forming the aperture part and a second coating film which is outside the first coating film and formed into the shape of a taper in the vicinity of the tip part.

Figure 4:
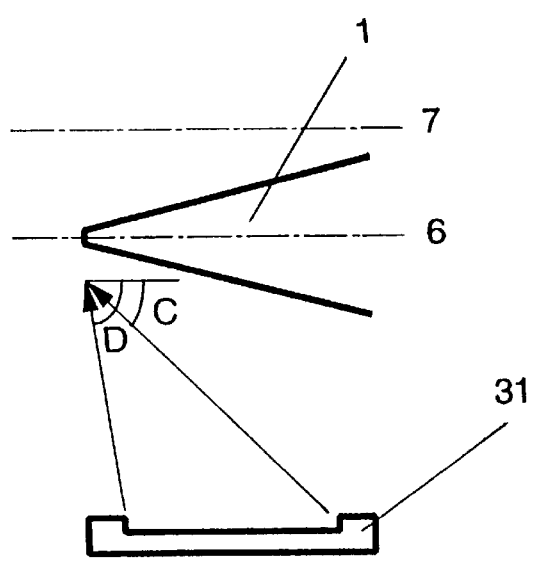
FIG. 4 is a figure showing a method for forming an aperture of an optical probe of the invention.

FIG. 4 is an figure which shows the method for forming a aperture of a optical probe as shown by the embodiment in FIG. 1 and shows a layout inside an vacuum evaporation apparatus in a vacuum evaporation process for forming a aperture. In the same manner as the method explained in FIG. 3(A), a deposition boat 31 is set which has a finite length in the direction in parallel with the direction of the sharpened tip part of the optical fiber 1. At this time, the deposition boat 31 is disposed at a position where the end of it is not beyond the tip of the optical fiber 1. As turning the optical fiber 1 around the central axis of its tip part, deposition is performed by heating the deposition boat 31 with electric current. Paying attention to the tip part of the optical fiber 1, a metal coating film is deposited in a deposition angle in a range from angle C to angle D in FIG. 4. Accordingly, as shown by the embodiment in FIG. 1, a metal coating film can be formed which has a curved surface retreating gradually from the aperture part to the outer circumference at the end of the aperture part. In case of turning the optical fiber 1 around an axis 7 in parallel with the central axis 6 of the tip part, if an eccentric distance of rotation of the optical fiber 1 is small enough in comparison with the distance between the deposition boat 31 and the optical fiber 1, the same effect can be obtained as the case that the optical fiber 1 is turned around the central axis 6 of the tip part. In case of not turning the optical fiber 1, deposition is separately and successively performed from at least two directions around the central axis 6 of the tip part. The deposition boat 31, which is selected according to a material to be deposited, is made of ceramic, tungsten, alumina, or the like.

Figure 5:
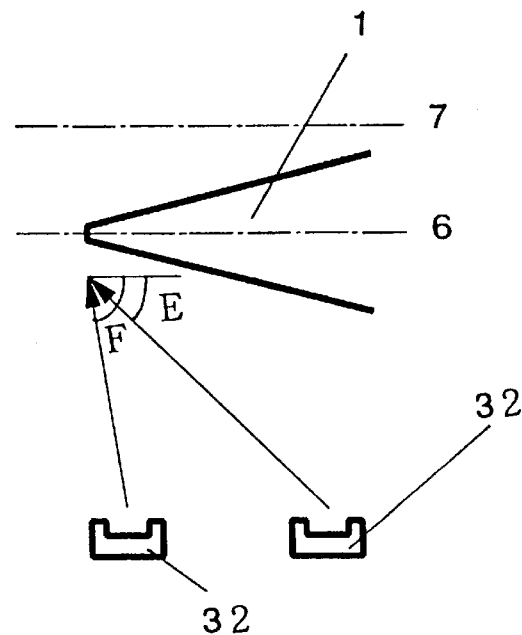
FIG. 5 is a figure showing a method for forming an aperture of an optical probe of the invention.

FIG. 5 is a figure which shows the method for forming an aperture of an optical probe as shown by the embodiment in FIG. 1 and shows a layout inside a vacuum evaporation apparatus in a vacuum evaporation process for forming an aperture.

This method is different in disposition of an evaporation source from the method for forming an aperture shown in FIG. 4. Two evaporation sources 32 are set in parallel with the direction of the sharpened tip part of the optical fiber 1. At this time, the first deposition boat 32 is disposed at a position where the end of it is not beyond the tip of the optical fiber 1. As turning the optical fiber 1 around the central axis of its tip part, deposition is performed by heating the evaporation sources 32. Paying attention to the tip part of the optical fiber 1, a metal coating film is deposited at the same time in two depositing directions of angle E and angle F in FIG. 5. Accordingly, as shown by the embodiment in FIG. 1, a metal coating film can be formed which has a curved surface retreating gradually from the aperture part to the outer circumference at the end of the aperture part. In case of turning the optical fiber 1 around an axis 7 in parallel with the central axis 6 of the tip part, if an eccentric distance of rotation of the optical fiber 1 is small enough in comparison with the distance between the deposition boats 32 and the optical fiber 1, the same effect can be obtained as the case that the optical fiber 1 is turned around the central axis 6 of the tip part. In case of not turning the optical fiber 1, deposition is separately and successively performed from at least two directions around the central axis 6 of the tip part.

Although a depositing method in which two evaporation sources 32 are disposed has been shown in FIG. 5, the same effect can be also by disposing two or more evaporation sources. As an evaporation source 32, a resistance heating evaporation source of tungsten, alumina, or the like or an electron beam evaporation source is used.

Figure 6:
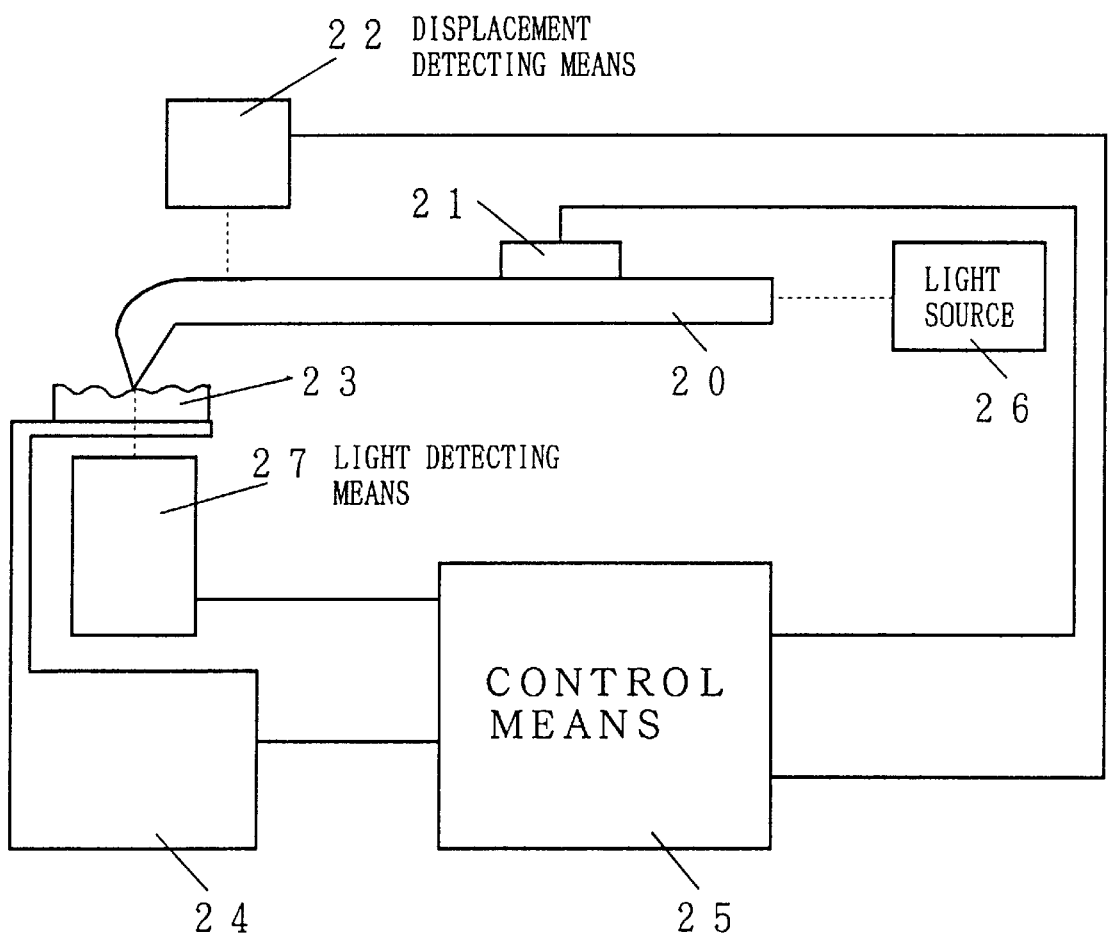
FIG. 6 is a figure of composition of a scanning near-field optical microscope using an optical probe of the invention.
Figure 7:
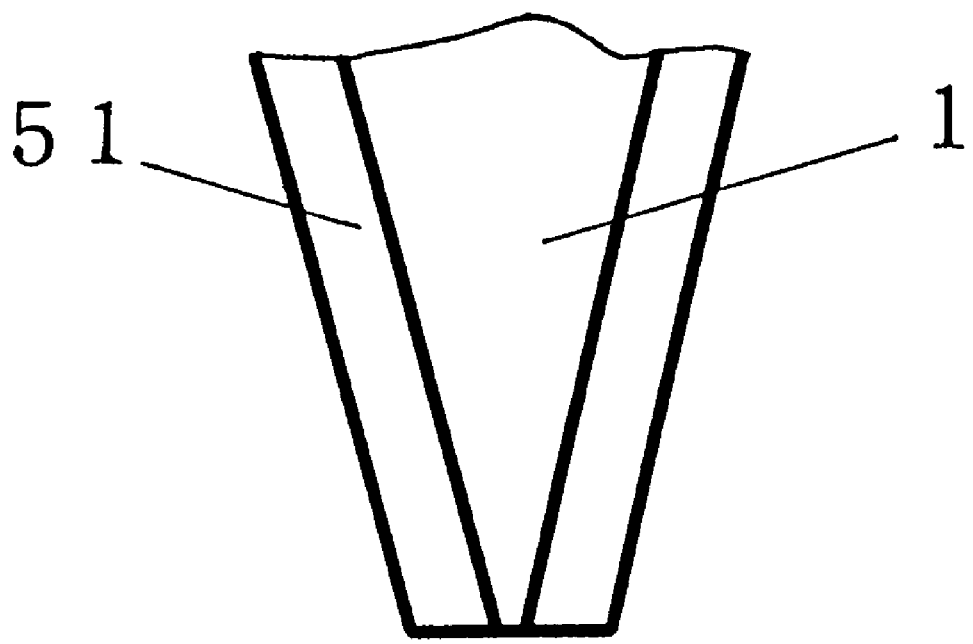
FIG. 7 is a sectional view showing composition of an optical probe of the prior art.

FIG. 6 shows the construction of a scanning near-field optical microscope using the optical probe of the invention. An optical probe 20 according to the present invention is set on a bimorph 21 which is a vibrating means, the tip of the optical probe 20 is vibrated vertically to a sample 23, and an atomic force or a force related to other interaction between the tip of the probe 20 and the surface of the sample 23 is detected by a displacement detecting means 22 as variation in the vibration characteristics of the probe 20. A topography is measured by scanning the sample by means of an XYZ moving mechanism 24, while controlling the optical probe 20 so as to keep constant the interval between its tip and the surface of the sample 23. At the same time, optical characteristics of a microscopic area of the sample are measured by introducing a light of a light source for measuring optical characteristics into the optical probe 20, applying the light to the sample 23 through the aperture of the tip of the probe 20, and detecting signals by means of an optical characteristics measuring light detecting means 27.

FIG. 6 shows a composition of a scanning near field optical microscope transmission type which detects a measuring light on the reverse face. A composition of a scanning near field optical microscope reflection type which detects a measuring light on the obverse face of the sample or to use a composition which detects a light by means of the optical probe 20 can get the same effect as the composition in FIG. 6.

FIG. 6 is an embodiment using an optical probe in the shape of a hook, the composition can also use an optical probe straight in shape. In a case of using a composition in which an optical probe straight in shape is used and the tip of the probe is vibrated horizontally to the surface of the sample 23, a scanning near-field optical microscope can be implemented which scans the sample while keeping constant the interval between the tip of the probe and the surface of the sample by utilizing a slipping force acting between the tip of the probe and the surface of the sample.

As described above, the composition of an optical probe of the invention can reduce an influence of thickness of the coating film upon a surface structure to be measured and make thicker the metal coating film in thickness by forming the metal coating film at the end part of the aperture into a curved surface. Therefore, it is possible to improve a topographic resolution. And since it is possible to prevent a light from leaking through the circumference of the aperture and prevent the aperture from being buried, it is possible to improve resolution and contrast of the optical image.

And the composition of an optical probe according to the invention can make small the tip diameter including a metal coating film of the optical probe and can improve the topographic resolution by using a coating film composed of the first coating film and the second coating film.

Furthermore, since the metal coating film is thicker rearwardly of the aperture, it is possible to prevent a light from leaking through the circumference of the aperture and prevent the aperture from being buried, and then it is possible to improve resolution and contrast of the optical characteristics.

And still further, according to a method for forming an aperture of an optical probe as described above, since it is possible to form a coating film into a curved surface at the end part of the aperture and make the metal coating film be composed of the first metal coating film forming the aperture and the second metal coating film which is outside the first metal coating film and is taper-shaped in the vicinity of the tip part, it is possible to easily form the aperture of an optical probe according to the invention.

What is claimed is:

1. An optical probe comprising:
   a waveguide having an optical opening for passing light therethrough, the optical opening forming a sharp tip at a distal end of the waveguide; and
   a metal film coated on the entire distal end of the waveguide except for the optical opening, the metal film having a curved surface gradually retreating from the optical opening to an outer circumference of the waveguide.

2. An optical probe comprising: a waveguide having an optical opening for passing light therethrough, the waveguide terminating in a sharp tip at a distal end thereof; a first coating film disposed on the distal end of the waveguide; and a second coating film disposed directly on the first coating film and having a tapered portion in the vicinity of the sharp tip, the first coating film and the second coating film being composed of the same material.

3. An optical probe according to claim 2; wherein the first coating film and the second coating film comprise metal films having a high reflectivity.

4. An optical probe according to claim 2; wherein the first coating film is disposed on the entire distal end of the waveguide.

5. An optical probe according to claim 2, wherein the second coating film has a first tapered surface portion positioned in the vicinity of the sharp tip at a first preselected angle relative to a central axis of the waveguide, and a second tapered surface portion contiguous with the first tapered surface portion and disposed at a second preselected angle relative to the central axis of the waveguide different from the first preselected angle.

6. A scanning near-field optical microscope for measuring topographical and optical characteristics of a sample, comprising:
   an optical probe comprised of a waveguide having an optical opening for passing light therethrough, the optical opening forming a sharp tip at a distal end of the optical probe, and a metal film coated on the entire distal end of the optical probe except for the optical opening, the metal film having a curved surface gradually retreating from the optical opening to an outer circumference of the waveguide;
   vibrating means for producing vertical or horizontal vibrations relatively between the sharp tip of the optical probe and the sample;
   displacement detecting means for detecting displacement of the optical probe; and
   control means for controlling a distance between the sharp tip of the optical probe and a surface of the sample on the basis of a detecting signal outputted by the detecting means.

7. An optical probe comprising: a waveguide having an optical opening for passing light therethrough, the waveguide terminating in a sharp tip at a distal end thereof; and a reflective material coated on the entire distal end of the waveguide except for the optical opening, the reflective material having a curved surface portion gradually retreating from the optical opening to an outer circumference of the waveguide.

8. An optical probe according to claim 7; wherein the reflective material has a tapered surface portion contiguous with the curved surface portion and disposed on the outer circumference of the waveguide.

9. An optical probe according to claim 7; wherein the reflective material comprises a metal selected from the group consisting of gold, platinum, aluminum, chromium and nickel.

10. An optical probe comprising: a waveguide having a central axis and an optical opening for passing light therethrough, the waveguide terminating in a sharp tip at a distal end thereof; a first reflecting material disposed on the distal end thereof except for the optical opening and disposed on an outer circumference of the waveguide; and a second reflecting material disposed on an outer circumference of the first reflecting material, the second reflecting material second reflecting material having a first tapered surface portion disposed in the vicinity of the sharp tip at a first preselected angle relative to the central axis of the waveguide and a second tapered surface portion contiguous with the first tapered surface portion and disposed at a second preselected angle relative to the central axis of the waveguide different from the first preselected angle.

11. An optical probe as claimed in claim 10; wherein the first reflecting material and the second reflecting material are composed of materials different from each other.

12. An optical probe as claimed in claim 11; wherein the first reflecting material consists of a metal film and the second reflecting material consists of a non-metal film.

13. An optical probe according to claim 10; wherein the first preselected angle is greater than the second preselected angle.

14. An optical probe according to claim 13; wherein the outer circumference of the first reflecting material comprises a tapered surface; and wherein the second tapered surface portion of the second reflecting material is generally parallel to the tapered surface of the first reflecting material.

15. An optical probe according to claim 10; wherein. the outer circumference of the first reflecting material comprises a tapered surface; and wherein the second tapered surface portion of the second reflecting material is generally parallel to the tapered surface of the first reflecting material.

16. An optical probe according to claim 10; wherein the first reflecting material and the second reflecting material are composed of the same material.

17. A scanning near-field optical microscope for measuring topographical and optical characteristics of a sample, comprising:

an optical probe comprised of a waveguide having an optical opening for passing light therethrough, the waveguide terminating in a sharp tip at a distal end thereof, and a reflective material coated on the entire distal end of the waveguide except for the optical opening, the reflective material having a curved surface portion gradually retreating from the optical opening to an outer circumference of the waveguide;

vibrating means for producing vertical or horizontal vibrations relatively between the sharp tip of the optical probe and the sample;

displacement detecting means for detecting displacement of the optical probe; and control means for controlling a distance between the sharp tip of the optical probe and a surface of the sample on the basis of a detecting signal outputted by the detecting means.

18. An optical probe according to claim 17; wherein the reflective material has a tapered surface portion contiguous with the curved surface portion and disposed on the outer circumference of the waveguide.

19. An optical probe according to claim 17; wherein the reflective material comprises a metal selected from the group consisting of gold, platinum, aluminum, chromium and nickel.

* * * * *